(12) United States Patent
Nord et al.

(10) Patent No.: US 9,130,425 B2
(45) Date of Patent: Sep. 8, 2015

(54) INTEGRATED ROTOR POLE PIECES

(75) Inventors: Göran Nord, Helsingborg (SE);
Lars-Olov Pennander, Helsingborg (SE); Alan G. Jack, Hexham (GB)

(73) Assignee: HOGANAS AB (PUBL), Hoganas (SE)

( * ) Notice: Subject to any disclaimer, the term of this patent is extended or adjusted under 35 U.S.C. 154(b) by 5 days.

(21) Appl. No.: 12/922,562

(22) PCT Filed: Mar. 18, 2009

(86) PCT No.: PCT/SE2009/050273
§ 371 (c)(1),
(2), (4) Date: Oct. 21, 2010

(87) PCT Pub. No.: WO2009/116935
PCT Pub. Date: Sep. 24, 2009

(65) Prior Publication Data
US 2011/0037329 A1    Feb. 17, 2011

Related U.S. Application Data

(60) Provisional application No. 61/064,835, filed on Mar. 28, 2008.

(30) Foreign Application Priority Data

Mar. 19, 2008 (DK) .................... 2008 00420

(51) Int. Cl.
*H02K 21/12* (2006.01)
*H02K 1/27* (2006.01)
*H02K 21/14* (2006.01)

(52) U.S. Cl.
CPC .............. *H02K 1/2773* (2013.01); *H02K 1/274* (2013.01); *H02K 21/145* (2013.01); *Y10T 29/49009* (2015.01)

(58) Field of Classification Search
CPC .............................. H02K 1/2773; H02K 21/12
USPC .................. 310/156.12, 156.26, 156.09, 310/156.66–156.73, 156.13, 156.15, 310/156.78, 156.55, 156.81, 426–427, 310/261.1, 263
IPC ........................................................ H02K 1/27
See application file for complete search history.

(56) References Cited

U.S. PATENT DOCUMENTS 3,575,650 A * 4/1971 Fengler .................... 318/135
5,536,987 A * 7/1996 Hayashi et al. ............. 310/263

(Continued)

FOREIGN PATENT DOCUMENTS

| EP | 0 762 617 A1 | 3/1997 | |
| EP | 998010 A1 * | 5/2000 | ............... H02K 1/27 |
| JP | 03-203558 A | 9/1991 | |
| JP | 2005045978 A * | 2/2005 | |

OTHER PUBLICATIONS

EPO Machine Translation, Guentensperger et al., EP 998010 A1, May 3, 2000.*

(Continued)

*Primary Examiner* — Thomas Truong
(74) *Attorney, Agent, or Firm* — Buchanan Ingersoll & Rooney P.C.

(57) ABSTRACT

A pole piece structure is provided to be used as part of an active rotor structure for an electrical rotary machine, wherein the active rotor structure is circular comprising pole pieces and permanent magnets magnetized in the circumferential direction of the rotor structure, wherein the rotor pole piece structure is a single structure with at least two individually spaced pole pieces connected by an integration bridge. Further provided is a method of manufacturing a rotor pole piece structure and a rotor for an electrical machine with a rotor pole piece structure. The assembly of magnets to the pole pieces is significantly enhanced using these rotor pole piece structures as described.

12 Claims, 10 Drawing Sheets

(56) References Cited

U.S. PATENT DOCUMENTS

| | | | |
|---|---|---|---|
| 5,607,525 A * | 3/1997 | Gay | 156/62.8 |
| 5,722,032 A | 2/1998 | Gay | |
| 5,898,253 A * | 4/1999 | El-Antably et al. | 310/261.1 |
| 5,969,459 A * | 10/1999 | Taniguchi et al. | 310/263 |
| 6,037,695 A * | 3/2000 | Kanazawa et al. | 310/263 |
| 7,196,446 B2 * | 3/2007 | Hans | 310/156.53 |
| 2008/0197737 A1 * | 8/2008 | Poulin et al. | 310/156.08 |

OTHER PUBLICATIONS

Machine Translation, Yamaguchi, JP 2005045978 A, Feb. 17, 2005.*
International Search Report (PCT/ISA/210) issued on May 14, 2009, by the International Searching Authority for International Application No. PCT/SE2009/050273.
Written Opinion (PCT/ISA/237) issued on May 14, 2009, by the International Searching Authority for International Application No. PCT/SE2009/050273.

* cited by examiner

INTEGRATED ROTOR POLE PIECES

FIELD OF THE INVENTION

The present invention relates to a rotor for an electrical rotary machine. The invention further relates to a method of manufacturing a rotor for an electrical rotary machine with a rotor pole piece structure. The assembly of magnets to the pole pieces is significantly enhanced using these rotor pole piece structures according to the present invention.

BACKGROUND OF THE INVENTION

During the years, electric machine designs evolved from modulated pole machines, claw pole machines, Lundell machines and transverse flux machines (TFM) have become more and more interesting. Electric machines using the principles of these machines were disclosed as early as about 1910 by Alexandersson and Fessenden. One of the most important reasons for the increasing interest is that the design enables a very high torque output in relation to, for instance, induction machines, switched reluctance machines and even permanent magnet brushless machines. Further, such machines are advantageous in that the coil is often easy to manufacture. However, one of the drawbacks of the design is that they are typically relatively expensive to manufacture and that they experience a high leakage flux which causes a low power factor and a need for more magnet material. The low power factor requires an up-sized power electronic circuit (or power supply when the machine is used synchronously) that also increases the volume, weight and cost of the total drive.

The modulated pole electric machine stator is basically characterised by the use of a central single winding that will magnetically feed multiple teeth formed by the soft magnetic core structure. The soft magnetic core is then formed around the winding, while for other common electrical machine structures the winding is formed around the tooth core section. Examples of the modulated pole machine topology are sometimes recognised as e.g. Claw-pole-, Crow-feet-, Lundell- or TFM-machines. The modulated pole machine with buried magnets is further characterised by an active rotor structure including a plurality of permanent magnets being separated by pole sections. The active rotor structure is built up from an even number of segments, whereas half the numbers of segments are made of soft magnetic material and the other half number of segments are made from permanent magnet material. The permanent magnets are arranged so that the magnetization direction of the permanent magnets is substantially circumferential, i.e. the north and south pole, respectively, is pointing in a substantially circumferential direction.

The state of the art method is to produce the rather large number of rotor segments, typically 10-50 individual pieces, as individual components. The assembly of these segments is further complicated by the opposing polarisation direction of the permanent magnet segments that will tend to repell the pole sections from each other during the assembly. The magnetic functionality of the soft magnetic pole sections in the desired machine structure is fully three-dimensional and it is required that the soft magnetic pole section is able to efficiently carry magnetic flux with high magnetic permeability in all three space directions. A traditional design using laminated steel sheets will not show the required high permeability in the direction perpendicular to the plane of the steel sheets and it is here beneficial to use a soft magnetic structure and material which shows a higher magnetic flux isotropy than a state of the art laminated steel sheet structure.

SUMMARY

Embodiments of the present invention provide a rotor solving one or more of the above-mentioned problems.

This is obtained by a rotor structure for an electrical rotary machine, wherein said rotor structure is tubular with a circular cross-section comprising rotor pole sections and permanent magnets magnetised in the circumferential direction of said rotor structure where two neighbouring permanent magnets are separated in the circumferential direction by a rotor pole section. Embodiments of the rotor structure comprise one or more rotor pole piece structures, each in the form of a single structure with at least respective parts of two individually spaced rotor pole sections connected by an integration bridge.

In some embodiments, all of the connected and integrated rotor pole sections show equal magnetic polarity after assembly to the magnetically active permanent magnets and there will then not be any additional magnetic leakage due to the integration bridge in-between the pole sections of the same integrated structure.

As the permanent magnets generate the rotor magnetic field, and since the permanent magnets are magnetically coupled directly to respective ones of the rotor pole sections, the integration bridge merely serves as a mechanical connection of the rotor pole sections with each other, so as to provide a stable arrangement of the rotor pole sections with well-defined distances between them, thereby facilitating fast and accurate arrangement of the permanent magnets in slots formed between the rotor pole sections. The integration bridge is not required and normally not even desired to carry magnetic flux, in particularly when the permanent magnets are the only magnetic source of the rotor structure, e.g. in a coilless rotor structure. Hence, the integration bridge may have a shape and a size large enough so as to provide sufficient mechanical strength to the pole piece structure to allow arrangement of the permanent magnets between the rotor pole sections. Furthermore, the integration bridge may have a shape and a size small enough so as to minimize any magnetic flux leakage.

The integration bridge between the pole sections may be physically distanced from the rotor pole sections, in particular the rotor pole sections of the respective other pole piece structure of opposite polarity, so that leakage in between the pole piece structures of opposite polarity will be minimised; the reduction of effective flux crossing the air-gap and potentially reducing torque of the machine is thereby minimised.

In an embodiment the rotor pole piece structures can be assembled to form a rotor by first positioning and fixing the rotor pole piece structures and secondly by slipping the permanent magnets into slots formed between the pole sections of the rotor pole piece structure. The assembly of magnets to the pole sections is significantly enhanced because of the geometric pre-positioning of the soft magnetic pole sections in the integrated rotor pole piece structure. In an embodiment the permanent magnets could be locked by gluing or by mechanical interlocking created by integrated geometrical features of the pole piece structure.

After the assembly has been performed, the rotor is ready for usage and therefore the integration bridge could be removed, e.g. cut off by machining, which would reduce the weight of the complete rotor. In an embodiment the rotor could be formed by using one rotor pole piece structure for half the pole sections and then add the permanent magnets and additional pole sections, respectively, to form the rotor.

In an embodiment said structure is made from soft magnetic material such as soft magnetic powder. By making the pole sections from soft magnetic powder the manufacturing of the rotor may be simplified and magnetic flux concentration, utilizing the advantage of effective three-dimensional flux paths, may be more efficient.

In an embodiment the structure is circular comprising a circular/ring-shaped integration bridge connecting individually spaced rotor pole sections. Thereby only two structures are necessary to form a rotor which further enhances the assembling of the rotor.

In an embodiment said structure is a circular subsection comprising an integration bridge in the form of a ring segment connecting at least two pole sections. Thereby only smaller and less complicated elements have to be manufactured, thus reducing the manufacturing complexity.

Depending on the manufacturing process of the structures and the required flux requirements, the integration bridge could either be placed with a radial distance to said pole sections or with an axial distance to said pole sections. Having an integration bridge with a radial distance results in a shorter, but wider rotor than having an integration bridge with an axial distance. The rotor could be used for both axial and radial rotary machines.

In an embodiment the pole sections have a width smaller than the distance between said pole sections. Thereby the pole piece structure can be used together with a similar pole piece structure to generate at least part of a rotor, leaving space to the permanent magnet after the assembly.

In some embodiments, each of the at least two rotor pole pieces is divided into respective first and second subsections, the respective subsections of each rotor pole section being part of respective rotor pole piece structures, i.e. the first subsection of a first one of the two rotor pole sections is connected via a first integration bridge to the first subsection of the second one of the two rotor pole sections, and the second subsection of the first rotor pole section is connected via a second integration bridge to the second subsection of the second rotor pole section. Each rotor pole piece structure provides one or more slots for at receiving at least a part of one of the permanent magnets, the slot being defined at least in part by the subsections that are connected to each other by the integration bridge.

Hence, in this embodiment, the integration bridge connects and integrates subsections of rotor pole sections that, after assembly with the permanent magnets, have different magnetic polarity. Even though such an arrangement results in a certain amount of magnetic leakage, this embodiment provides slots for receiving the permanent magnets where the size of the slot in at least the circumferential direction is defined by the dimensions of the individual integrated rotor pole piece structures rather than defined by an assembly of different pole piece structures. Therefore, the parts of the rotor structure can be assembled with an increased precision.

In some embodiments, a rotor pole piece structure comprises two pole subsections extending in axial direction along respective lateral sides of the permanent magnet, the subsections being connected with each other at each end by respective integration bridges so as to surround the permanent magnet in axial and circumferential direction, while leaving an opening extending in radial direction through the pole piece structure for receiving the permanent magnet. The lateral outward side faces of the pole piece structure abut to corresponding side faces of other, like pole piece structures to form the rotor. In one embodiment, the side faces are parallel with the axial direction, while in another embodiment, the lateral side faces of a rotor pole piece are arranged at an angle relative to the axial direction so as to form a wedge-shaped pole piece structure. Hence one of the ends, seen in axial direction, of the wedge-shaped pole piece structure is wider in the circumferential direction than the other end. Such wedge shaped structures may be arranged with alternating orientation, i.e. a wide end of a first pole piece structure is arranged adjacent to the narrow ends of the respective neighbouring wedge-shaped pole piece structures. It is an advantage of this embodiment, that the assembly of the rotor is further facilitated, as the individual pole piece structures can be aligned relative to each other by applying axial pressure. In particular, axial alignment of the rotor pole piece structures ensures accurate inter-magnet distances in the circumferential direction. Furthermore, the permanent magnets may then be slid into the slots of the respective pole piece structures.

The invention further relates to a method of manufacturing a rotor as disclosed herein. The rotor pole piece structure may be shaped in one piece by compaction of soft magnetic powder in a tool.

The soft magnetic powder could be a substantially pure water atomised iron powder or a sponge iron powder having irregular shaped particles which have been coated with an electrical insulation. In this context the term "sub-stantially pure" means that the powder should be substantially free from inclusions and that the amount of the impurities O, C and N should be kept at a minimum. The average particle sizes are generally below 300 μm and above 10 μm.

However, any soft magnetic metal powder or metal alloy powder may be used as long as the soft magnetic properties are sufficient and that the powder is suitable for die compaction.

The electrical insulation of the powder particles may be made of an inorganic material. Especially suitable are the type of insulation disclosed in U.S. Pat. No. 6,348,265 (which is hereby incorporated by reference), which concerns particles of a base powder consisting of essentially pure iron having an insulating oxygen- and phosphorus-containing barrier. Powders having insulated particles are available as Somaloy®500, Somaloy®550 or Somaloy®700 available from Höganas AB, Sweden.

Thereby the integrated pole sections are efficiently made in the same operation by use of a powder forming method where the forming is made in a single compaction tool set up.

An embodiment of the method described herein comprises the steps of
combining a first and a second pole piece structure each with individually spaced rotor pole sections connected by an integration bridge, wherein the structures are combined forming slots between their pole sections,
arranging at least one permanent magnet between said first and second pole piece structure.

BRIEF DESCRIPTION OF THE DRAWINGS

In the following, preferred embodiments of the invention will be described referring to the figures, where.

DESCRIPTION OF EMBODIMENTS

Figure 1:
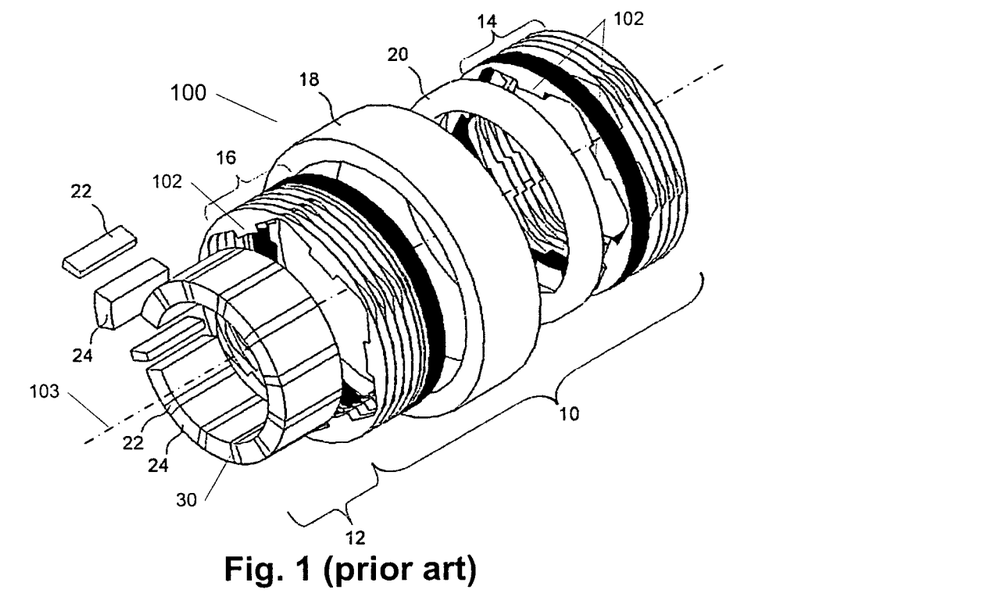
FIG. 1 is a schematic, exploded, perspective view of a state of the art radial modulated pole electric machine and prior art rotor/stator design.

This invention is in the field of a modulated pole electric machine 100 of which one example is shown in FIG. 1 in a schematic, exploded, perspective view. The modulated pole electric machine stator 10 is basically characterised by the use of a central single winding 20 that will magnetically feed multiple teeth 102 formed by the soft magnetic core structure. The stator core is then formed around the winding 20 while for other common electrical machine structures the winding is formed around the individual tooth core section. Examples of the modulated pole machine topology are sometimes recognised as e.g. Claw-pole-, Crow-feet-, Lundell- or TFM-machines. More particularly the shown modulated pole electric machine 100 comprises two stator core sections 14, 16 each including a plurality of teeth 102 and being substantially circular, a coil 20 arranged between the first and second circular stator core sections, and a rotor 30 including a plurality of permanent magnets 22. Further, the stator core sections 14, 16, the coil 20 and the rotor 30 are encircling a common geometric axis 103, and the plurality of teeth of the two stator core sections 14, 16 are arranged to protrude towards the rotor 30 for forming a closed circuit flux path. The machine in FIG. 1 is of the radial type as the stator teeth protrudes in a radial direction towards the rotor in this case with the stator surrounding the rotor. However, the stator could equally well be placed interiorly with respect to the rotor which type is also illustrated in some of the following figures. The scope of invention as presented in the following is not restricted to any specific type of modulated pole electric machine and can equally well be applied to machines of both the axial and the radial type and for both interiorly and exteriorly placed stators relative to the rotor. Similarly, the invention is not restricted to single phase machines but can equally well be applied to multi phase machines.

The active rotor structure 30 is built up from an even number of segments 22, 24 whereas half the numbers of segments also called rotor pole sections 24 are made of soft magnetic material and the other half of number of segments of permanent magnet material 22. The state of art method is to produce these segments as individual components. Often the number of segments can be rather large typically of order 10-50 individual sections. The permanent magnets 22 are arranged so that the magnetization directions of the permanent magnets are substantially circumferential, i.e. the north and the south pole, respectively, is facing in a substantially circumferential direction. Further, every second permanent magnet 22, counted circumferentially is arranged having its magnetization direction in the opposite direction in relation to the other permanent magnets. The magnetic functionality of the soft magnetic pole sections 24 in the desired machine structure is fully three dimensional and it is required that the soft magnetic pole section 24 is able to efficiently carry varying magnetic flux with high magnetic permeability in all three space directions. A traditional design using laminated steel sheets will not show the required high permeability in the direction perpendicular to the plane of the steel sheets and its here beneficial to use a soft magnetic structure and material that shows a higher magnetic flux isotropy than a state of art laminated steel sheet structure.

Figure 2:
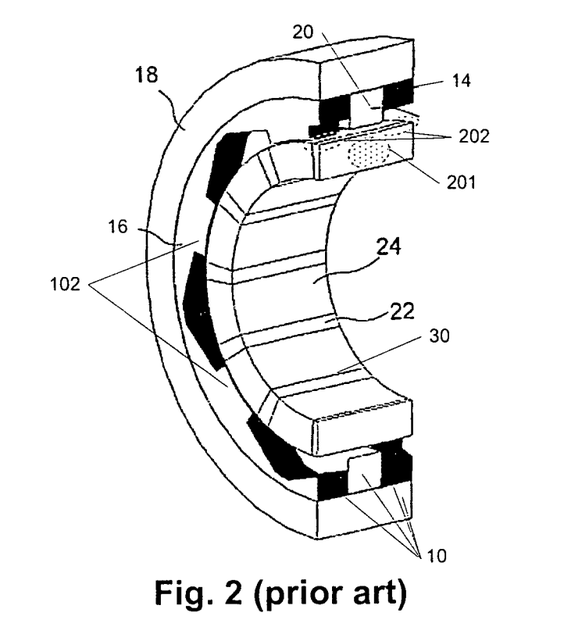
FIG. 2 is a cross-sectional view of the radial modulated pole electric machine in FIG. 1.

FIG. 2 shows the same radial modulated pole electric machine as from FIG. 1 but in a cross-sectional view of the assembled machine showing more clearly how the stator teeth 102 extend towards the rotor and how the stator teeth of the two stator core sections 14, 16 are rotationally displaced in relation to each other.

Figure 3A:
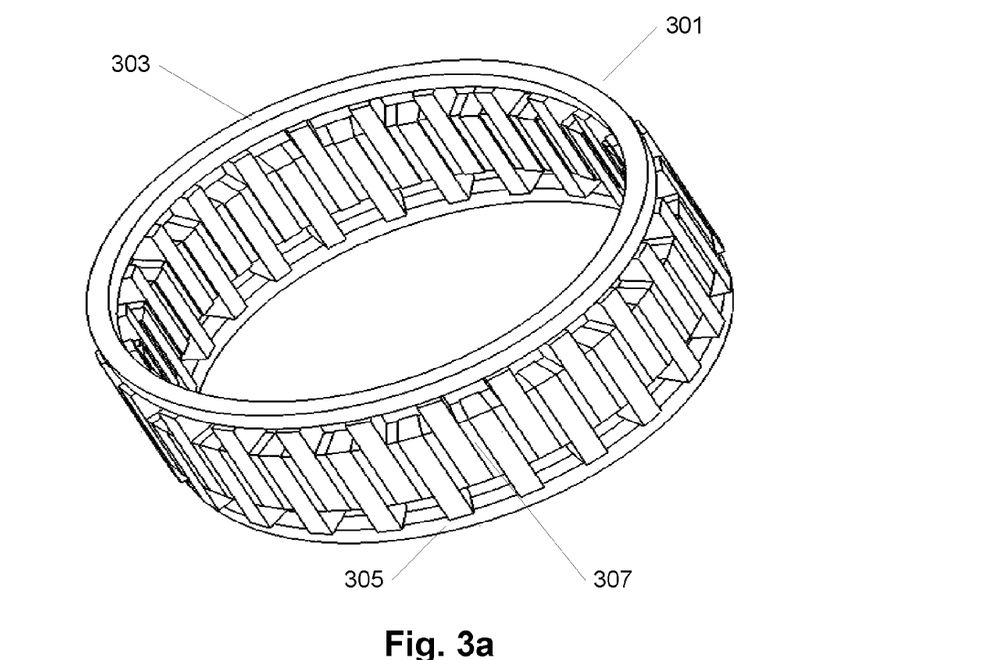
FIG. 3a illustrates a rotor for an electrical machine according to the present invention.

In FIG. 3a the rotor 301 for an electrical machine according to an embodiment of the present invention is illustrated. The rotor comprises a first and a second rotor pole piece structure 303, 305 each with half of the rotor pole sections of the rotor, and in slots between neighbouring rotor pole sections from the first and the second rotor pole piece structure, respectively, permanent magnets 307 are positioned.

The pole sections of the rotor pole piece structures are connected by an integration bridge. The integration bridge may have the form of a ring-shaped element or in the form of a ring-segment. In this embodiment, each of the rotor pole piece structures connects pole pieces of the same respective polarity.

In FIG. 3a each rotor pole piece structure is one integrated element, whereby two structures along with the number of permanent magnets are necessary to form a rotor, but in alternative embodiments each structure could be formed by a number of interconnected rotor pole piece structures.

Figure 3B:
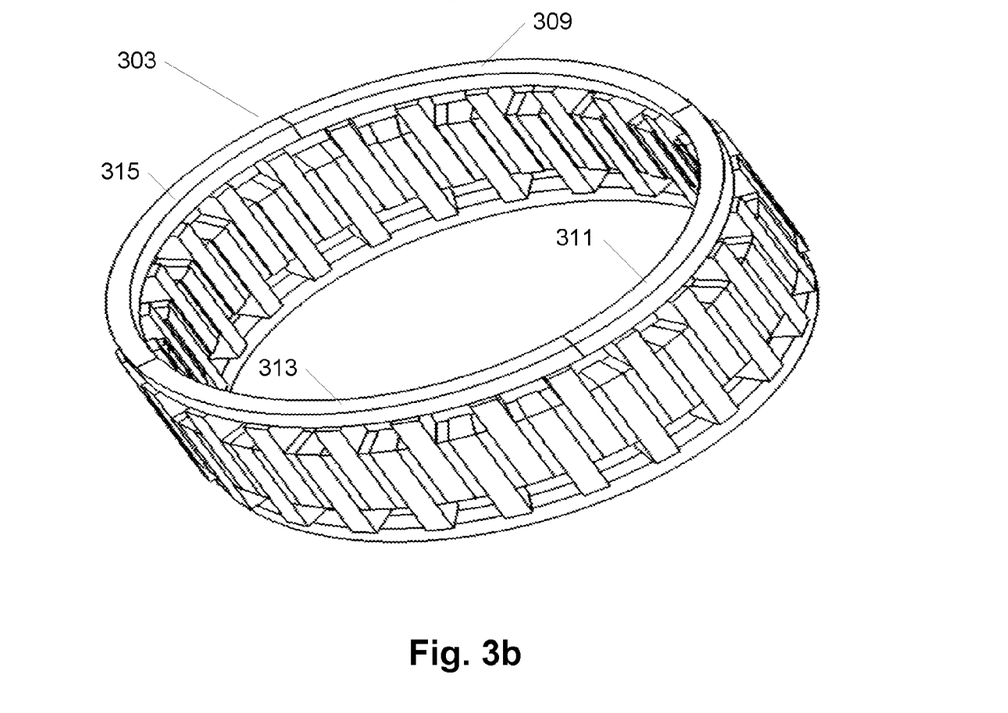
FIG. 3b illustrates a rotor for an electrical machine according to the present invention.

FIG. 3b illustrates an embodiment where a number of interconnected rotor pole piece structures are used to form the rotor. Four interconnected rotor piece structures 309, 311, 313, 315 now constitute the rotor pole piece structure 303 illustrated in FIG. 3a.

Figure 4A:
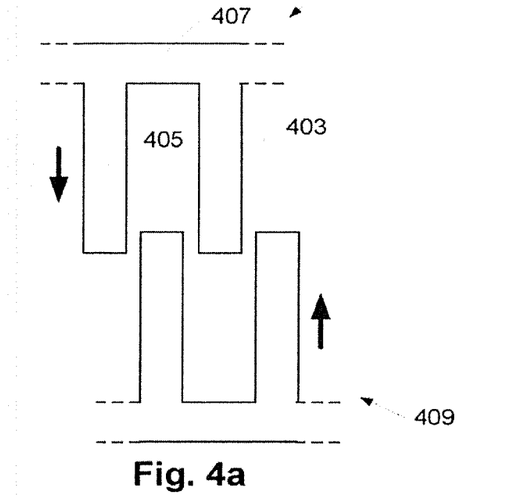
FIGS. 4a, 4b and 4c illustrate an embodiment of an assembly principle of assembling rotor pole piece structures to form a rotor.
Figure 4B:
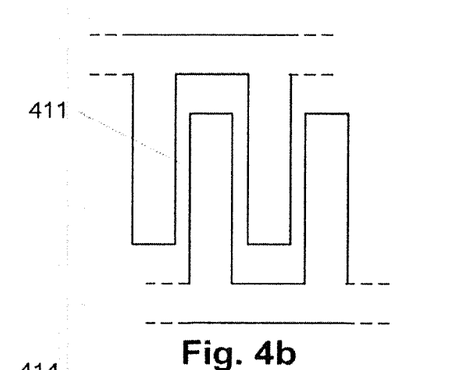
Figure 4C:
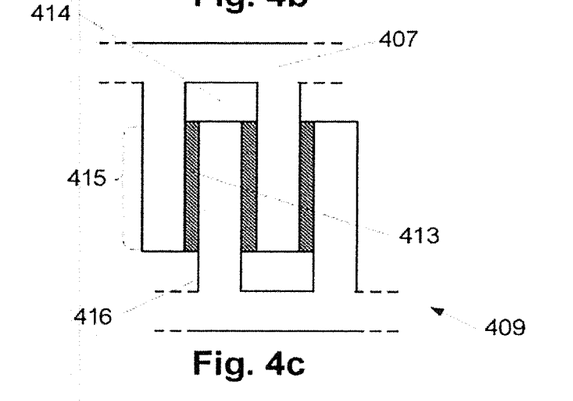

In FIGS. 4a, 4b and 4c the assembly principle of assembling rotor pole piece structures to form a rotor is illustrated.

In FIG. 4a the rotor pole piece structure or part of a rotor pole piece structure 401 is illustrated; the rotor pole piece structure comprises pole sections 403, 405 connected by an integration bridge 407. The pole sections of a similar rotor pole piece structure 409 are added by insertion according to the illustrated arrows. In FIG. 4b the pole piece structures have been positioned and fixed, where the distance between the rotor pole sections and the dimension of the rotor pole sections ensure that a slot 411 is present between the pole sections. In FIG. 4c permanent magnets 413 have been slipped into the slots formed between the pole sections.

The integration bridge between the pole sections is physically distanced to the pole sections so that leakage in between the pole piece structures of opposite polarity will be minimised; the reduction of effective flux crossing the air-gap and potentially reducing torque of the machine is thereby minimised. In the example of FIG. 4, the integration bridge 407 is axially displaced from the rotor pole sections of the other pole piece structure 409, leaving an air gap 414 preventing leakage. To this end the rotor pole sections 405 comprise an active part 415 that is in direct magnetic connection with one of the permanent magnets 413, and a connection part 416 that is not directly in contact with the permanent magnet 413 and that is connected to the integration bridge 407.

Figure 5:
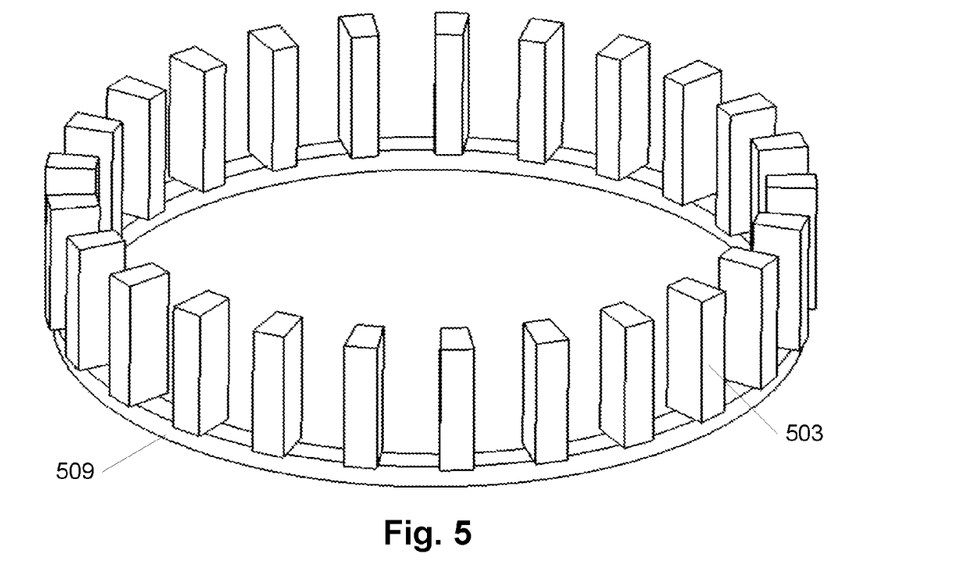
FIG. 5 illustrates an embodiment of a rotor pole piece structure with an axially displaced integration bridge.

In FIG. 5 an embodiment of a rotor pole piece structure with an axially displaced integration bridge is illustrated. In this embodiment, integration bridge 509 is a ring-shaped structure having two lateral, ring-shaped side faces and radially inward and outward circumferential surfaces. The rotor pole sections 503 are connected to and axially extend from one of the lateral side faces.

Figure 6:
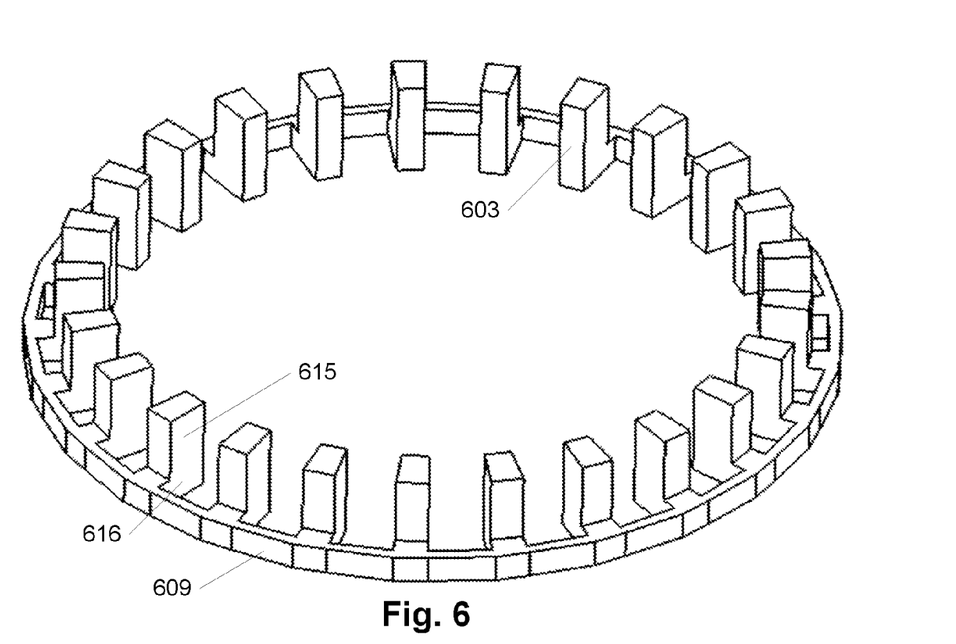
FIG. 6 illustrates an embodiment of a rotor pole piece structure with a radially displaced integration bridge.
Figure 10:
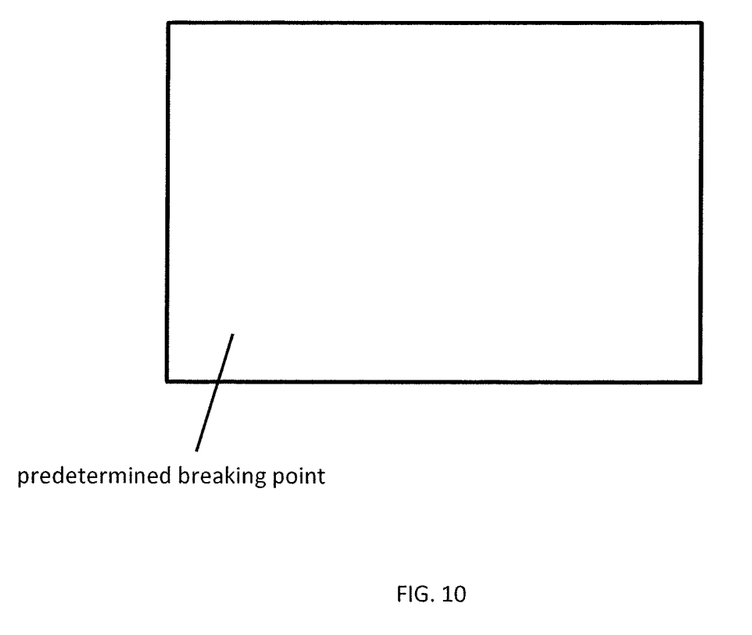
FIG. 10 illustrates an embodiment of a rotor pole piece structure with a radially displaced integration bridge wherein the connection parts have a predetermined breaking point for disconnecting the integration bridge from rotor pole pieces.

In FIG. 6 an embodiment of a rotor pole piece structure with a radially displaced integration bridge is illustrated. In this embodiment, integration bridge 609 is a ring-shaped structure having two lateral, ring-shaped side faces and radially inward and outward circumferential surfaces. The rotor pole sections 603 are connected to, and axially extend from one of the circumferential surfaces, in this example from the radially inward surface. The rotor pole sections 603 have an L-shape structure including an axial part 615 that, when assembled in the rotor, are in contact with the permanent magnets, and a connection part 616 radially extending from the axial part and being connected to the integration bridge 609. It will be appreciated that the connection part 616 may extend from the axial part 615 at an angle different from 90 deg. FIG. 10 shows an embodiment with a predetermined breaking point for disconnecting the integration bridge from the rotor pole sections.

Figure 7:
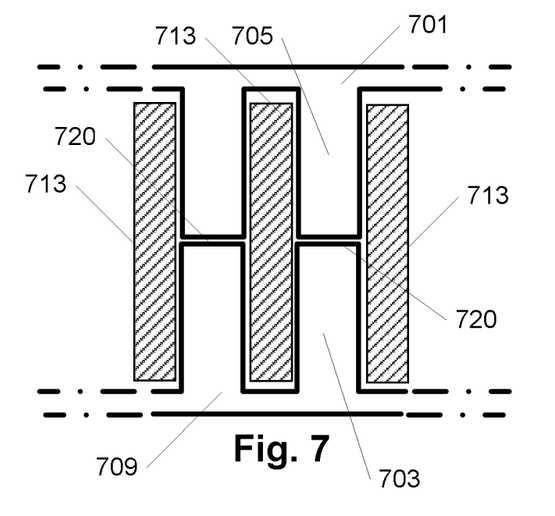
FIG. 7 illustrates another embodiment of an assembly principle of assembling rotor pole piece structures to form a rotor.

FIG. 7 illustrates another embodiment of an assembly principle of assembling rotor pole piece structures to form a rotor. In this embodiment rotor pole piece structures 701 and 709 are arranged with permanent magnets 713 to form a rotor. The rotor pole piece structures 701 and 709 are similar to the rotor pole piece structures described in connection with FIGS. 4-6. However, in this embodiment the axial length of the pole pieces 703 and 705 is shorter than the axial length of the permanent magnets 713 such that the combined length of the rotor pole pieces 705 and 703 is the same or larger than the axial length of the permanent magnets. Furthermore, in the embodiment of FIG. 7, the circumferential distance between pole sections of the same rotor pole is substantially equal to the width of the permanent magnets 713. In the assembled rotor, the rotor pole piece structures 701 and 709 are arranged such that the distal end faces 720 of the pole sections 705 of rotor pole piece structure 701 abut the corresponding end faces of the pole sections 703 of rotor pole piece structure 709 so as to form slots for the permanent magnets 703.

Figure 8A:
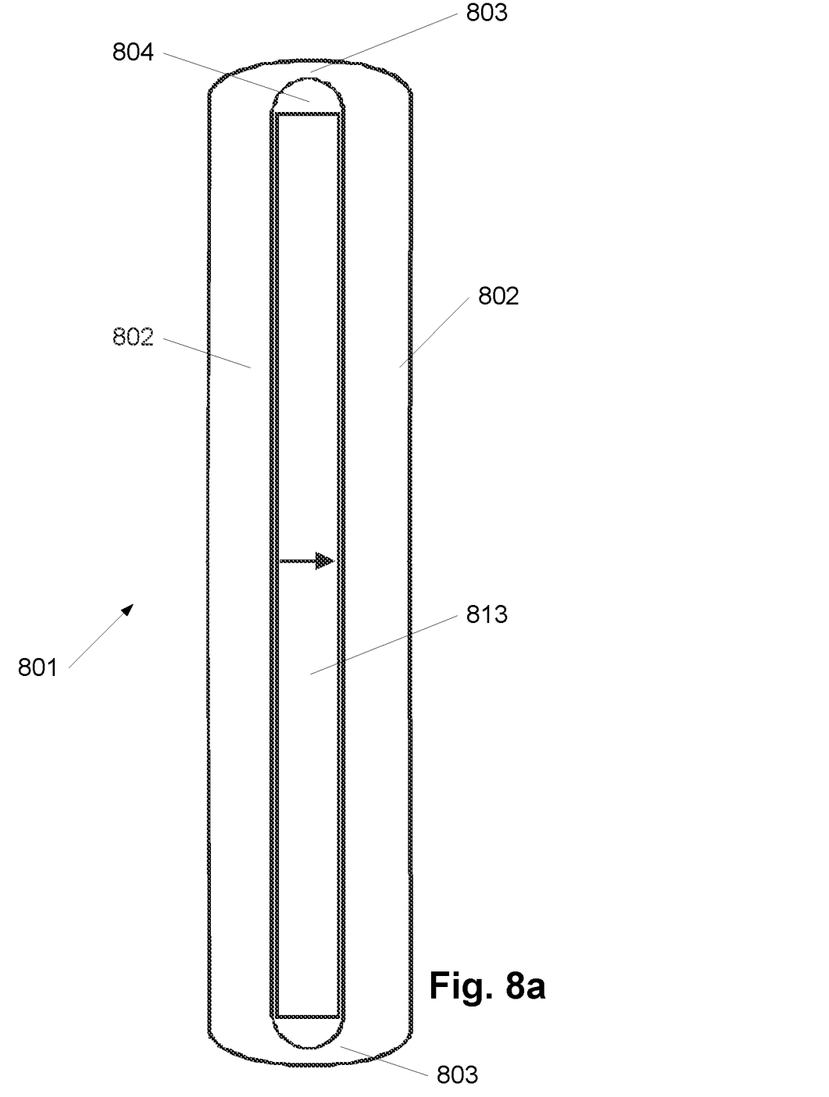
FIGS. 8a, 8b, 8c and 8d illustrate 8 illustrates yet another embodiment of a rotor.
Figure 8B:
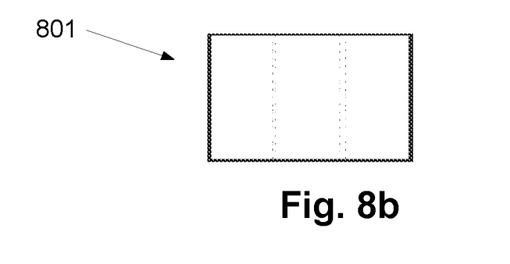
Figure 8C:
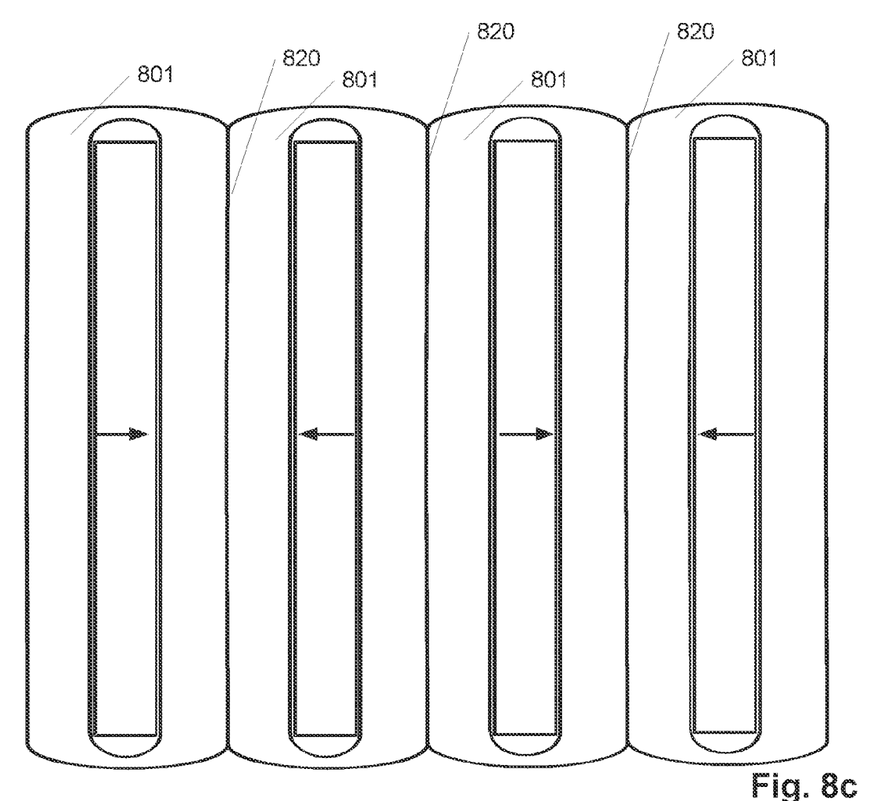
Figure 8D:
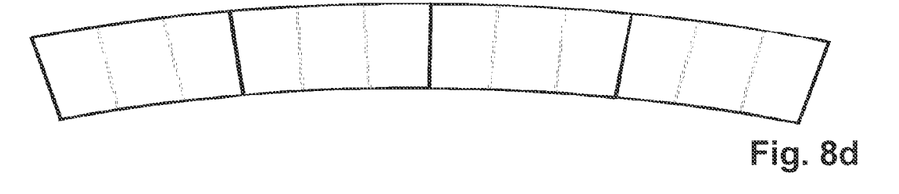

FIGS. 8a, 8b, 8c and 8d illustrate yet another embodiment of a rotor. FIG. 8a shows a top view, i.e. seen in radial direction of an embodiment of a rotor pole piece structure, generally designated 801. FIG. 8b shows a cross sectional view of the rotor pole piece structure 801, FIG. 8c shows a top view, seen in the radial direction, of a part of a rotor including four like pole piece structures 801, and FIG. 8d shows a cross sectional view of the part of the rotor.

The rotor of this embodiment is arranged of a number of pole piece structures 801 and a like number of permanent magnets 813. Each pole piece structure 801 comprises a subsection 802 of the pole section that separates two permanent magnets in the circumferential direction. To this end, the pole piece structure comprises two elongated side parts 802 that extend parallel with each other in axial direction. At their end parts, the side parts 802 are connected to each other by integration bridges 803 leaving a slot 804 between side parts 802 for receiving the permanent magnet 813. Hence, in this embodiment, the surfaces 820 at which neighbouring pole piece structures abut each other are all parallel with the axial direction.

Figure 9A:
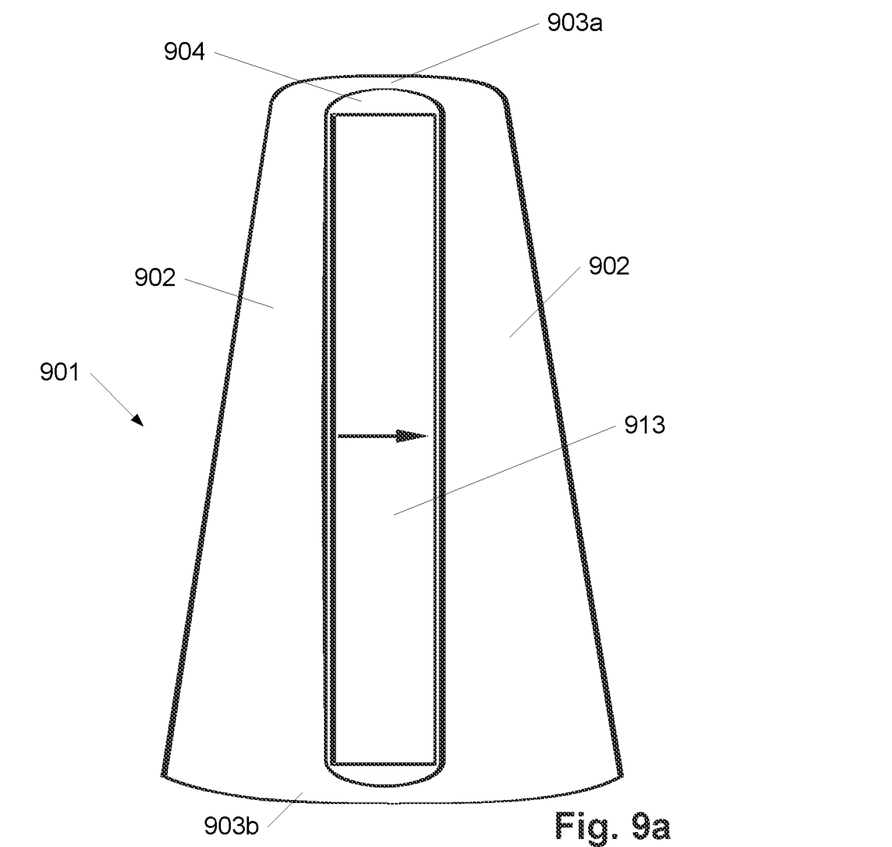
FIGS. 9a, 9b, 9c and 9d illustrate yet another embodiments of a rotor.
Figure 9B:
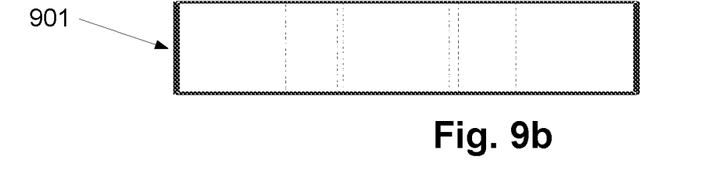
Figure 9C:
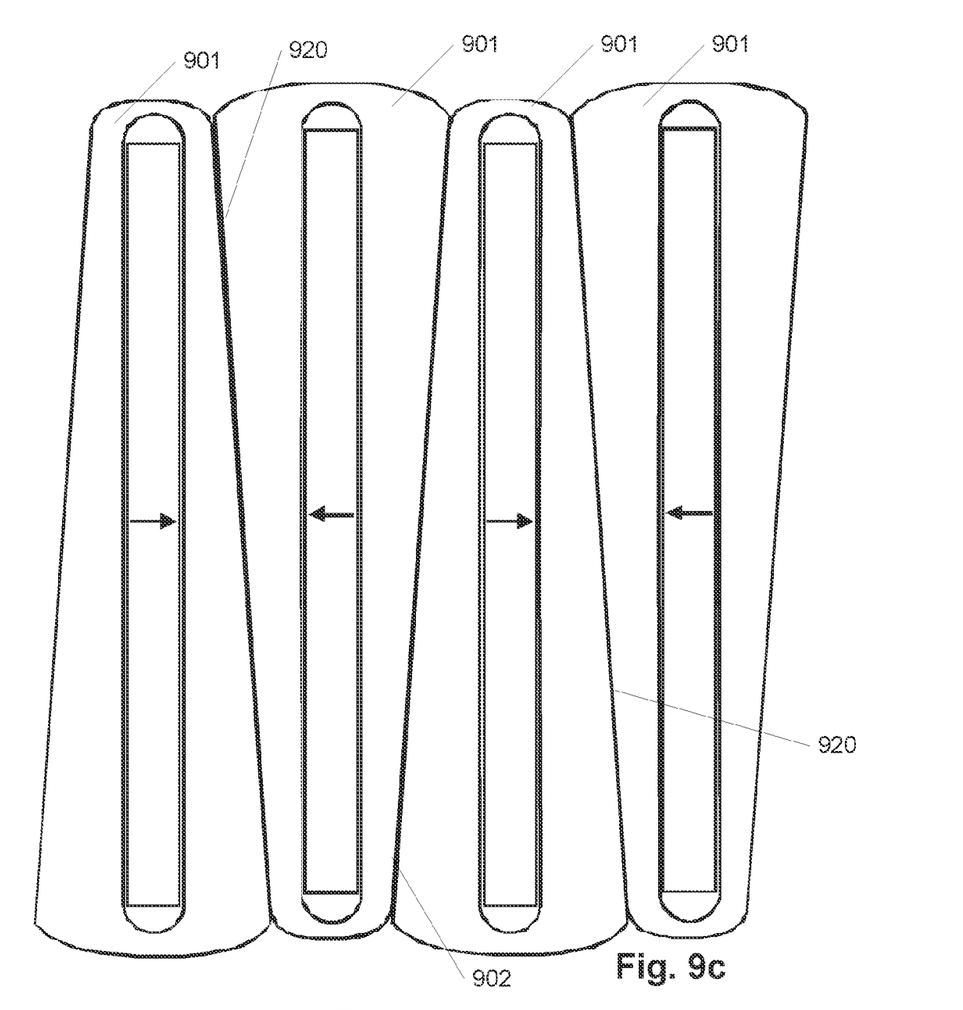
Figure 9D:
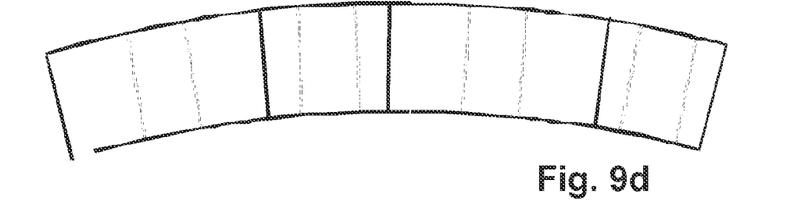

FIGS. 9a, 9b, 9c and 9d illustrate yet another embodiment of a rotor. FIG. 9a shows a top view, i.e. seen in radial direction of an embodiment of a rotor pole piece structure, generally designated 901. FIG. 9b shows a cross sectional view of the rotor pole piece structure 901, FIG. 9c shows a top view, seen in the radial direction, of a part of a rotor including four like pole piece structures 901, and FIG. 9d shows a cross sectional view of the part of the rotor.

The rotor of this embodiment is arranged of a number of pole piece structures 901 and a like number of permanent magnets 913 in a similar manner as the rotor of FIGS. 8a, 8b, 8c and 8d. As in FIGS. 8a, 8b, 8c and 8d, each pole piece structure 901 of the embodiment of FIGS. 9a, 9b, 9c and 9d comprise two elongated side parts 902 having respective inwardly opposing side faces that extend parallel with each other in axial direction. At their end parts, the side parts 902 are connected to each other by integration bridges 903a and 903b leaving a slot 904 between side parts 902 for receiving the permanent magnet 913. However, while the pole piece structures 801 of FIGS. 8a, 8b, 8c and 8d have the same width in circumferential direction over their entire axial length, the width of the pole piece structures 901 gradually changes from a wide end 903b to a narrow end 903a, thus resulting in a wedge-shaped structure. As illustrated in FIGS. 9c and 9d, the wedge-shaped structures 901 are arranged with alternating orientation to form a tubular rotor structure. Hence, in this embodiment, the surfaces 920 at which neighbouring pole piece structures abut are arranged at an angle relative to the axial direction.

The invention claimed is:

1. A coilless rotor for an electrical rotary machine, the rotor being configured to generate a rotor magnetic field for interaction with a stator magnetic field of a
stator of the electrical rotary machine, the rotor comprising: a first pole piece structure with at least two individually spaced rotor pole sections connected by a first integration bridge so as to form a single structure, wherein the rotor pole sections extend in axial direction of the rotor, wherein there is a distance between the rotor pole sections, and the rotor pole sections have a width smaller than the distance between the rotor pole sections;
a second pole piece structure with at least two individually spaced rotor pole sections connected by a second integration bridge so as to form a single structure, wherein the rotor pole sections extend in axial direction of the rotor, wherein there is a distance between the rotor pole sections, and the rotor pole sections have a width smaller than the distance between the rotor pole sections; and
permanent magnets,
wherein said rotor is tubular,
wherein the first and second pole piece structures are arranged such that distal ends of the rotor pole sections of the first pole piece structure axially extend beyond, while being circumferentially spaced apart from, distal ends of the rotor pole sections of the second pole piece structure so as to form slots between the rotor pole sections,
wherein the first and second pole piece structures are arranged such that the first integration bridge is axially separated from the rotor pole sections of the second pole piece structure and such that the second integration bridge is axially separated from the rotor pole sections of the first pole piece structure,
wherein the permanent magnets are arranged along circumference of the tubular rotor and magnetised in circumferential direction of said rotor so as to generate the rotor magnetic field, wherein at least one permanent magnet is arranged between said first and second pole piece structure, the axially extending rotor pole sections directing the rotor magnetic field generated by said permanent magnets in a radial direction, each permanent magnet having a first and second magnetic pole, wherein the rotor pole sections of the first pole piece structure are magnetically coupled to the first pole of respective ones of the permanent magnets, and the rotor pole sections of the second rotor pole piece structure are magnetically coupled to the second pole of respective ones of the permanent magnets.

2. The rotor according to claim 1, wherein each of said integration bridges is an annular integration bridge formed as one integrated segment.

3. The rotor according to claim 1, wherein each of said integration bridges is a ring segment connecting at least two pole sections.

4. The rotor according to claim 1, wherein each of the at least two rotor pole sections of the first pole piece structure has an axially extending active part magnetically coupled to two of the permanent magnets, and a connection part extending from the active part and being displaced from the permanent magnets, the connection part being connected to the first integration bridge.

5. The rotor according to claim 4, wherein the connection part extends in axial direction from the active part such that said first integration bridge is placed with an axial distance to the active part of said pole sections.

6. The rotor according to claim 4, wherein the connection part has a predetermined breaking point for disconnecting the first integration bridge from the at least two rotor pole sections.

7. A coilless rotor for an electrical rotary machine, the rotor being configured to generate a rotor magnetic field for interaction with a stator magnetic field of a stator of the electrical rotary machine,
wherein said rotor is tubular and comprises permanent magnets arranged along the circumference of the tubular rotor and magnetised in circumferential direction of said rotor so as to generate the rotor magnetic field, the permanent magnets being separated from each other in the circumferential direction of the rotor by axially extending rotor pole sections for directing the rotor magnetic field generated by said permanent magnets in a radial direction,
wherein at least respective parts of two of said rotor pole sections are connected with each other by an integration bridge so as to form a single structure, wherein the at least two rotor pole sections extend in axial direction of the rotor,
wherein each of the at least two rotor pole sections has an axially extending active part magnetically coupled to two of the permanent magnets, and a connection part extending from the active part and being displaced from the permanent magnets, the connection part being connected to the integration bridge,
wherein the connection part extends at an angle from the active part such that said integration bridge is placed with a radial distance to the active part of said pole sections.

8. A coilless rotor for an electrical rotary machine, the rotor being configured to generate a rotor magnetic field for interaction with a stator magnetic field of a stator of the electrical rotary machine,
the rotor comprising:
a first pole piece structure with two pole subsections;
a second pole piece structure with two pole subsections; and permanent magnets,
wherein said rotor is tubular,
wherein an axially extending rotor pole section is formed from a pole subsection from the first pole piece structure and from a pole subsection from the second pole piece structure,
wherein the permanent magnets are arranged along circumference of the tubular rotor and magnetised in circumferential direction of said rotor so as to generate the rotor magnetic field, wherein at least two permanent magnets are separated from each other in the circumferential direction of the rotor by the axially extending rotor pole section directing the rotor magnetic field generated by said permanent magnets in a radial direction,
wherein the two pole subsections of the first pole piece structure extend in axial direction along respective lateral sides of one of the permanent magnets, the two pole subsections being connected with each other at each end by respective integration bridges so as to surround the permanent magnet in axial and circumferential direction and to form a single structure,
wherein the two pole subsections of the second pole piece structure extend in axial direction along respective lateral sides of one of the permanent magnets, the two pole subsections being connected with each other at each end by respective integration bridges so as to surround the permanent magnet in axial and circumferential direction and to form a single structure.

9. The rotor according to claim 8, wherein each of the first and second pole piece structures is wedge-shaped in an axial direction.

10. The rotor according to claim 8, wherein each of the at least two rotor pole subsections has an axially extending active part magnetically coupled to two of the permanent magnets, and a connection part extending from the active part and being displaced from the permanent magnets, the connection part being connected to the integration bridge.

11. A coilless rotor for an electrical rotary machine, the rotor being configured to generate a rotor magnetic field for interaction with a stator magnetic field of a stator of the electrical rotary machine,
the rotor comprising:
a first pole piece structure with two pole subsections;
a second pole piece structure with two pole subsections; and
permanent magnets,
wherein said rotor is tubular,
wherein an axially extending rotor pole section is formed from a pole subsection from the first pole piece structure and from a pole subsection from the second pole piece structure,
wherein the permanent magnets are arranged along circumference of the tubular rotor and magnetised in circumferential direction of said rotor so as to generate the rotor magnetic field, wherein at least two permanent magnets are separated from each other in the circumferential direction of the rotor by the axially extending rotor pole section directing the rotor magnetic field generated by said permanent magnets in a radial direction,
wherein the two pole subsections of the first pole piece structure extend in axial direction along respective lateral sides of one of the permanent magnets, the two pole subsections being connected with each other at an end by an integration bridge so as to surround the permanent magnet in axial direction and to form a single structure,
wherein the two pole subsections of the second pole piece structure extend in axial direction along respective lateral sides of one of the permanent magnets, the two pole subsections being connected with each other at an end by an integration bridge so as to surround the permanent magnet in axial direction and to form a single structure.

12. A coilless rotor for an electrical rotary machine, the rotor being configured to generate a rotor magnetic field for interaction with a stator magnetic field of a stator of the electrical rotary machine, the rotor comprising:
a first pole piece structure with at least two individually spaced rotor pole sections connected by a first integration bridge so as to form a single structure, wherein the rotor pole sections extend in axial direction of the rotor, wherein there is a distance between the rotor pole sections, and the rotor pole sections have a width smaller than the distance between the rotor pole sections;
a second pole piece structure with at least two individually spaced rotor pole sections connected by a second integration bridge so as to form a single structure, wherein the rotor pole sections extend in axial direction of the rotor, wherein there is a distance between the rotor pole sections, and the rotor pole sections have a width smaller than the distance between the rotor pole sections; and
permanent magnets,
wherein said rotor is tubular,
wherein the first and second pole piece structures are arranged such that the rotor pole sections of the first pole piece structure are axially in-line with the rotor pole sections of the second pole piece structure so as to form slots between the rotor pole sections,
wherein the first and second pole piece structures are arranged such that the first integration bridge is axially separated from the rotor pole sections of the second pole piece structure and such that the second integration bridge is axially separated from the rotor pole sections of the first pole piece structure,
wherein the permanent magnets are arranged along circumference of the tubular rotor and magnetised in circumferential direction of said rotor so as to generate the rotor magnetic field, wherein at least one permanent magnet is arranged between said first and second pole piece structure, the axially extending rotor pole sections directing the rotor magnetic field generated by said permanent magnets in a radial direction, each permanent magnet having a first and second magnetic pole, wherein a first rotor pole section of the first pole piece structure and a first rotor pole section of the second pole piece structure are magnetically coupled to the first pole of respective ones of the permanent magnets, a second rotor pole section of the first pole piece structure and a second rotor pole section of the second pole piece structure are magnetically coupled to the second pole of respective ones of the permanent magnets.

* * * * *